United States Patent Office 3,518,149
Patented June 30, 1970

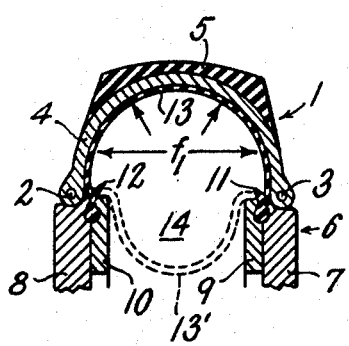
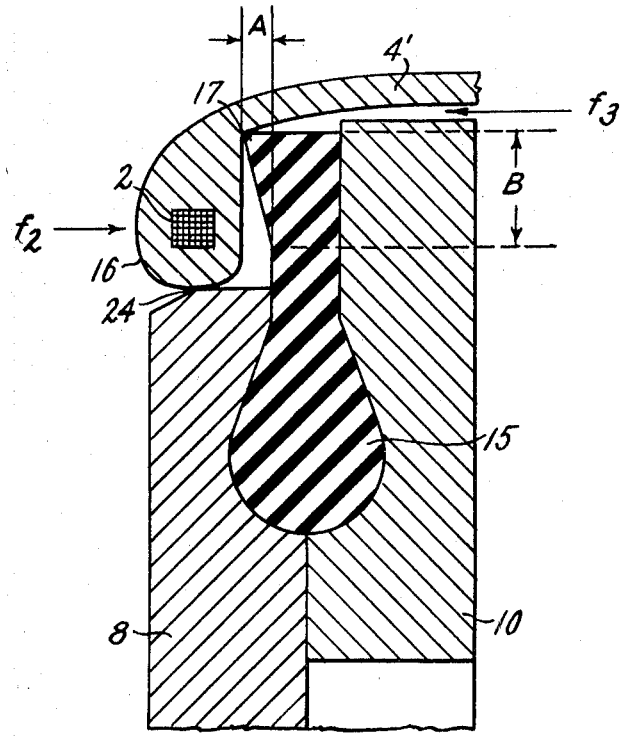
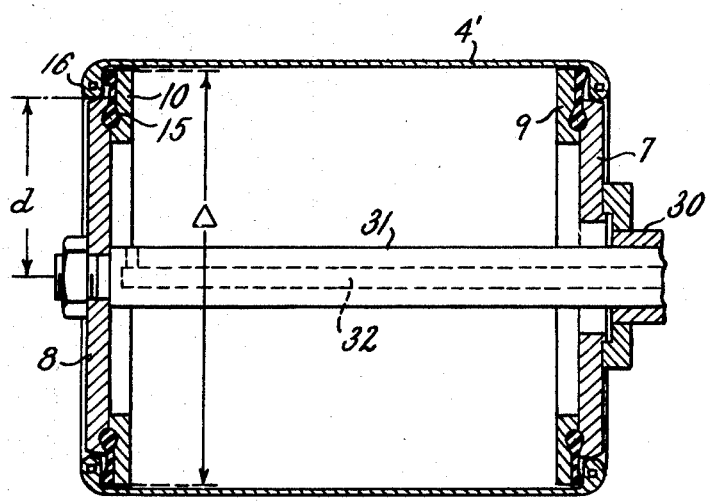
INVENTOR
HENRI MIRTAIN
ATTORNEY

3,518,149
SEALING APPARATUS FOR SHAPING OF RADIAL TIRE CARCASSES
Henri Mirtain, Compiegne, France, assignor to Societe Francaise du Pneu Englebert, Clairoix, Val-d'Oise, France, a corporation of France
Filed May 18, 1966, Ser. No. 551,021
Claims priority, application France, Apr. 14, 1966, 57,688
Int. Cl. B29h 17/26, 17/16
U.S. Cl. 156—416        3 Claims

ABSTRACT OF THE DISCLOSURE

Sealing apparatus including a resilient annular seal for each end flange of tire building supports on which the tire carcass is to be inflated. The seal has a lip having a cross section, at the periphery, of a right triangle with the hypotenuse extending outwardly to sealingly contact the inner bead area of the tire carcass when inflated, but forming a clearance prior to inflation.

---

The present invention relates to a sealing apparatus utilized in manufacturing tires, and, more particularly, to sealing apparatus that makes it possible to inflate the carcass of a tire directly on the movable supports of the machine before putting on the tread, without employing a sealing web.

Up to now a radial ply tire carcass has been made by rotating a drum on which are wound successive layers or folds of rubberized material. After having placed the wires at both ends of the substantially cylindrical tire carcass so obtained, the carcass has to be shaped before being vulcanized in a mold, that is, given the form of a torus in a shaping machine by compressing the casing in the axial direction and inflating it by compressed air in the radial direction.

This operation of inflating, or curving, of the tire carcass is generally carried out by means of a web, or sheet of rubber stretched between two movable supports which form the drum of the machine.

After application of the tread, the tire body has to be removed from its support, and the web is then in the way. In order that this web should not be damaged by the removal of the tire body, it is necessary to evacuate the air in the chamber which had just been compressed to inflate the tire body, and this stage of the operation makes it necessary to have both a compressor and an evacuation pump.

It is an object of the present invention to provide special sealing apparatus which enables the said sealing web to be dispensed with, and consequently also dispenses with having to evacuate beneath the casing.

Other objects of the invention are:

To provide an air-tight sealing apparatus which ensures the desired seal simply by application, without sticking or greasing;

To provide a removable seal;

To provide seals which can be adapted to existing various tire-manufacturing machines, for example, shaping machines;

To provide for a shaping machine sealing apparatus which enables the finished tire body to be easily removed from its support;

To provide strong sealing apparatus which will not be damaged by the repeated removal of finished tire bodies and which ensures the desired seal even after being dismantled many times;

To provide sealing apparatus which makes it unnecessary to evacuate the inflation chamber of the shaper each time the web has to be disengaged to remove the finished tire.

Other characteristics and advantages will be apparent from the description which follows, with reference to the accompanying drawings, of embodiments of the invention by way of example, and the scope of the invention will be pointed out in the appended claims.

In these drawings:

FIG. 1 is a partial sectional view of a finished radial ply tire body on its shaping machine according to the prior art;

FIG. 2 is a sectional view to a larger scale of sealing apparatus according to the invention mounted in a shaping machine of the FIG. 1 type;

FIG. 7 is a sectional view of a tire carcass supported on a shaping machine including sealing apparatus in accordance with the invention.

Figure 3:
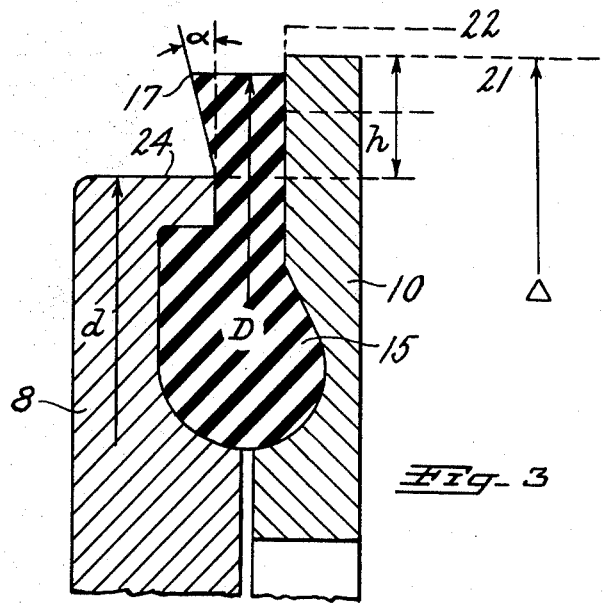
FIG. 3 is a view similar to that of FIG. 2 of another embodiment of the invention.

In FIG. 1 a tire body 1 is seen, formed between two bead wires 2 and 3 and comprising a carcass, or stack of successive plies 4 and a tread 5. The tire body lies on its drum 6, which comprises two supports 7 and 8 which are movable in opposite axial directions, and two annular plates 9 and 10, which plates confine beads 11 and 12 provided according to the prior art at the ends of a web 13 against supports 7 and 8 respectively.

Pressure chamber 14 allows web 13 to be inflated against carcass 4 which, from the cylinder that it was before inflation of curving, takes the shape of a torus and is then ready to be vulcanized in a mould, as shown by arrows $f_1$.

The tire body must first be removed from its support and, so that this operation may be carried out without damaging the web, the web must be removed from the path of the tire, to a position such as represented in broken-line construction 13', which is done under suction by subjecting chamber 14 to a fairly high vacuum.

In accordance with the invention, seal 15, which is seen in cross-section in FIGS. 2 and 7, is adapted to be seated in the housing of web bead 12, between support 8 and annular plate 10 for example. The rubberized plies 4' are represented in FIG. 2 in the form of a substantially cylindrical cross-section before inflation, and at the moment of inflation a reaction is directed in a direction of arrow $f_2$, this reaction being effective to permit lip 17 of seal 15 to be applied in a sealing manner against carcass 4' under the effect of an air pressure such as that coming from the direction shown by arrow $f_3$ from the inflation chamber 14 of which carcass 4' forms one wall.

Figure 4:
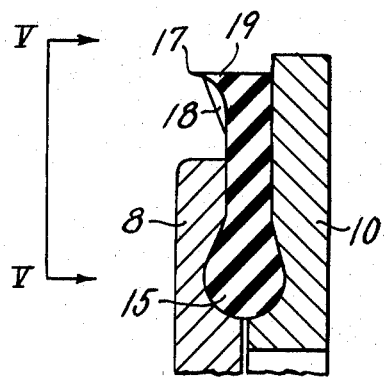
FIG. 4 is a sectional view of another embodiment of the invention.
Figure 5:
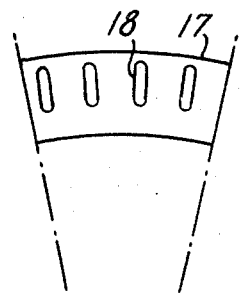
FIG. 5 is a front view taken along line V—V of FIG. 4.

FIGS. 4 and 5 are views of an embodiment of sealing apparatus according to the invention with similar elements identified by the same reference numerals as the FIG. 2 embodiment; in particular FIGS. 4 and 5 show a rib 18 which stiffens lip 19.

Figure 6:
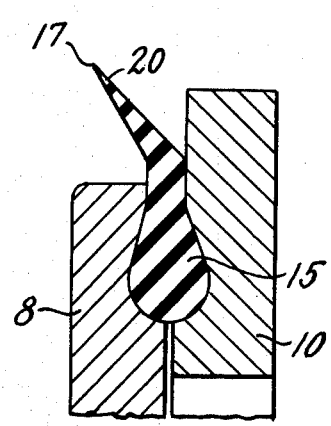
FIG. 6 is a view of another embodiment.

FIG. 6 represents another embodiment of seal 15.

FIG. 7 represents the sealing apparatus in accordance with the invention supporting a tire carcass 4' prior to inflation of the carcass. Suitable axially slidable and rotatable shafts 30, 31 support the plate 7, 8. A bore 32 in the shaft 31 serves as an air inlet to the chamber formed by the tire carcass and the sealing apparatus. The plates 7, 8 approach each other as the carcass is inflated and shaped.

However, the preferred embodiment is advantageously that of FIGS. 2 or 3, in which similar elements are identified by the same reference numerals as the FIG. 2 embodiment in which height B is between three and five times the thickness A of lip 17. In the same way, angle α of the said nose is advantageously comprised between 10° and 20°.

Finally, diameter Δ of plates 9 and 10 is generally greater than diameter d of the tire grip 24 within the limits indicated by the inequalities:

$$d+30 \text{ mm.} > \Delta > d+20 \text{ mm.}$$

The rim of the plate is then advantageously placed at line 21, as in FIG. 3. Diameter Δ of annular plates 9 and 10 forms an obstacle upon removal of the finished tire body, which bears at grip surface 24, outside of drum 6 after manufacture. The annular plates may, however, be larger, as represented by line 22; the drawback which results is an increase in the height h of the grip which consequently makes removal of the finished tire more difficult. The annular plates 9 and 10 may have a smaller diameter than that of seal 15 as represented by line 23, but in this case the seal is not protected during repeated removals and the seal may be broken off, or, at any rate, have a shorter life.

The seal 15 is advantageously made of solvent-resistant rubber, such as acrylonitrile butadiene, which may be moderately or very hard.

It is seen that the sealing apparatus according to the invention enables the carcass of a tire to be inflated directly during manufacture for the correct application of its tread before vulcanization, so that the apparatus does not use a sealing web which compels the operator to evacuate the inflation chamber in order to move the web aside after use. Thus, an installation including a compressor and an evacuation pump can be very advantageously replaced by a simple compressor.

While there have been described what are at present believed to be the preferred embodiments of the invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. In apparatus for shaping tire carcasses, sealing apparatus effective with a tire carcass to form an airtight closure comprising:
   a wall, having an outer region, for supporting the bead region of a tire carcass;
   a solid resilient annulus secured to said outer region of said wall with a sealing lip having a substantially circular periphery, the radial cross section of said lip having substantially the shape of a right triangle having a right angle bounded by two sides and having a hypotenuse, the length of the one side of said right angle of said triangle being shorter than the length of the other side of said right angle, the shorter side of said right angle being along said circular periphery and having an axially outward end with respect to the tire carcass, the longer side of said right angle extending radially outwardly with respect to said circular periphery and having a radially inward end and said hypotenuse of said right triangle extending from said radially inward end of said longer side to said axially outward end of said shorter side;
   the bead region of the tire carcass and said hypotenuse of said cross section of said annulus forming a clearance prior to inflation of the tire carcass and forming an airtight closure when the tire carcass is inflated to press the bead region of the tire carcass against said annulus.

2. Sealing apparatus in accordance with claim 1 in which said hypotenuse of said right triangle of said cross section of said lip is at an angle in the range of 10 to 20 degrees with respect to a line perpendicular to the axis of the tire carcass.

3. Sealing apparatus in accordance with claim 1 in which the length of said shorter side of said right angle of said triangle is in the range of ⅓ to ⅕ the length of said other side of said right angle.

References Cited

UNITED STATES PATENTS

| | | | |
|---|---|---|---|
| 1,667,263 | 4/1928 | Mather | 156—133 |
| 1,789,858 | 1/1931 | Backdahl | 156—417 X |
| 3,107,192 | 10/1963 | McNenney | 156—416 |

JOHN T. GOOLKASIAN, Primary Examiner

C. B. COSBY, Assistant Examiner

U.S. Cl. X.R.

156—133